US007620179B2

(12) United States Patent
Fahrny et al.

(10) Patent No.: US 7,620,179 B2
(45) Date of Patent: Nov. 17, 2009

(54) SYSTEM AND METHOD FOR SECURITY PROCESSING MEDIA STREAMS

(75) Inventors: James William Fahrny, Pueblo, CO (US); Charles Compton, Philadelphia, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 992 days.

(21) Appl. No.: 10/767,980

(22) Filed: Jan. 29, 2004

(65) Prior Publication Data

US 2005/0169468 A1   Aug. 4, 2005

(51) Int. Cl.
 *H04N 7/167* (2006.01)
(52) U.S. Cl. ..................................... 380/210
(58) Field of Classification Search .................. 380/210
 See application file for complete search history.

(56) References Cited

U.S. PATENT DOCUMENTS

| 4,860,353 | A | | 8/1989 | Brown |
| 5,054,067 | A | | 10/1991 | Moroney et al. |
| 5,784,095 | A | * | 7/1998 | Robbins et al. ............... 725/49 |
| 5,982,363 | A | * | 11/1999 | Naiff ........................ 715/721 |
| 6,016,348 | A | * | 1/2000 | Blatter et al. ............... 380/228 |
| 6,271,837 | B1 | * | 8/2001 | Naiff ........................ 715/716 |
| 6,424,717 | B1 | * | 7/2002 | Pinder et al. ................ 380/239 |
| 6,976,163 | B1 | * | 12/2005 | Hind et al. .................. 713/156 |
| 7,069,452 | B1 | * | 6/2006 | Hind et al. ...................... 713/1 |
| 2001/0046299 | A1 | | 11/2001 | Wasilewski et al. |
| 2002/0136406 | A1 | | 9/2002 | Fitzhardinge et al. |
| 2003/0123667 | A1 | | 7/2003 | Weber et al. |
| 2003/0219127 | A1 | | 11/2003 | Russ et al. |
| 2004/0057579 | A1 | | 3/2004 | Fahrny |
| 2004/0098591 | A1 | | 5/2004 | Fahrny |

FOREIGN PATENT DOCUMENTS

WO     03043310     5/2003

OTHER PUBLICATIONS

Jim Lyle. "HDCP: what it is and how to use it" Originally Published Apr. 18, 2002 pp. 1-5, and Figures 1-6. http://www.edn.com/index.asp?layout=articlePrint&articleID=CA209091.*
FCC News: Commision Adopts "Navigation Devices" Rules Creating Consumer Market for Set Top Boxes and Other Equipment Used with Video Programming Systems (CS Docket 97-80). Originally Published Jun. 11, 1998 pp. 1-3 http://www.fcc.gov/Bureaus/Cable/News—Releases/1998/nrcb8013.html.*

(Continued)

*Primary Examiner*—Kim Vu
*Assistant Examiner*—Thomas Gyorfi
(74) *Attorney, Agent, or Firm*—Banner & Witcoff, Ltd.

(57) ABSTRACT

A system for multi-stream security processing and distributing digital media streams includes a headend, a network, and at least one receiver. The headend is generally configured to generate encrypted digital media streams. The network may be coupled to the headend and configured to receive the encrypted digital media streams. The at least one receiver may be coupled to the network and configured to receive the encrypted digital media streams and present a decrypted version of the encrypted digital media streams. At least one of the headend and the at least one receiver include a security processor that may be configured to provide at least one of simultaneous multiple encryption and simultaneous multiple decryption processing of the digital media streams.

23 Claims, 3 Drawing Sheets

OTHER PUBLICATIONS

"Explorer® 4200HD Home Gateway" © 2002 Scientific Atlanta Inc. http://www.sciatl.com/products/consumers/userguidepdfs/4001344.pdf.*

Hopper, Andy, A Network Striped Storage System for Video on Demand, article, http://citeseer.ist.psu.edu/26010.html.

ANSI/SCTE 41 2003 (Formerly DVS 301 POD Copy Protection Standard.

FIPS Pub 140-2 "Security Requirements for Cryptographic Modules", May 25, 2001, http://www.itl.nist.gov/fibspubs/.

FIPS Pub 186-2, "Digital Signature Standard" Federal Information Processing Standards Publication (FIPS Pub), Jan. 27, 2000, http://www.itl.nist.gov/fibspubs/.

FIPS-Pub 180-2, "Secure Hash Standard" Federal Information Processing Standards Publication (FIPS Pub), Aug. 1, 2002, http://www.itl.nist.gov/fibspubs/.

FIPS-Pub 46-3 "Data Encryption Standard", Oct. 25, 1999 http://csrc.nist.gov/publications/fips/fips46-3/flips46-3.pdf.

FIPS-Pub 81 "DES Modes of Operation", Dec. 2, 1980; http://www.itl.nist.gov/fipspubs/fip81.htm.

IETF RFC 1750, Randomness Recommendations for Security, (Donald Eastlake, Stephen Crocker and Jeff Schiller), Dec. 1994, www.ietf.org/.

IETF RFC 2104, HMAC: Keyed-Hashing for Message Authentication, (Krawczyk, Bellare, and Canetti), Mar. 1996, www.ietf.org/.

IETF RFC 2630, Cryptographic Message Syntax, (R. Housley), Jun. 1999, www.ietf.org/.

IETF RFC 3280, "Internet X.509 Public Key Infrastructure Certificate and CRL Profile", R. Housley, W. Ford, W. Polk, D. Solo, Jan. 2002, www.ietf.org/.

RSA1, "PKCS #1: RSA Encryption Standard", Version 1.5, RSA Laboratories, Nov. 1993 2.2 Reference Acquisition, http://www.rsasecurity.com/rsalabs/pkcs/.

CableLabs Specifications, www.opencable.com, p. 1.

* cited by examiner

SYSTEM AND METHOD FOR SECURITY PROCESSING MEDIA STREAMS

BACKGROUND OF THE INVENTION

1. Field of the Invention

The present invention relates to a system and a method for security processing media streams.

2. Background Art

Conventional implementations of media (e.g., video, audio, video plus audio, and the like) program stream delivery systems(e.g., cable, satellite, etc.) include a headend where the media programming originates (i.e., is encoded and compressed, groomed, statmuxed, and otherwise appropriately processed), a network (e.g., cable or satellite) for delivery of the media programming to the client (i.e., customer, user, buyer, etc.) location, at least one set top box (STB) at the client location for conversion (e.g., decryption and decompression) of the media programming stream, and at least one respective viewing device such as a television (TV) or monitor that is connected to the STB.

Conventional headends and STBs employ particular matching encryption/decryption and compression/decompression technologies. However, there is little standardization of particular matching encryption/decryption across media program stream delivery system vendors. The encryption/decryption and compression/decompression technologies in the particular conventional system are fixed and often proprietary to the vendor. Furthermore, conventional media service processing and delivery systems typically implement security processes in connection with individual implementations of point of deployment, CableCard, Smartcard, etc. systems.

Transitions to upgrades in encryption/decryption and compression/decompression technologies are, therefore, expensive and difficult for the media program stream delivery system vendors to implement. As such, customers can be left with substandard service due to the lack of standardization and the reduced competition that the lack of standardization has on innovation in media service delivery. The lack of standardization also restricts the ability of media service providers to compete. For example, customers may have viewing devices that could take advantage of the improved technologies, however, media stream delivery system upgrades may be impossible, impracticable, or not economically feasible for vendors using conventional approaches. A significant level of customer dissatisfaction may result.

As a result, it would be desirable to have an improved system and method for security processing media streams that addresses the above indicated problems with conventional approaches as well as providing additional improvements.

SUMMARY OF THE INVENTION

The present invention generally provides an improved system and method for security processing digital media streams. The improved system and method for security processing media streams of the present invention may be compatible with previously used (i.e., legacy) systems and methods using all levels of media stream processing and delivery service (i.e., basic to high-end) as well as adaptable to future implementations, and that is flexible, renewable, re-configurable, and supports simultaneous multiple security systems and processes.

According to the present invention, a system for multi-stream security processing and distributing digital media streams is provided. The system comprises a headend, a network, and at least one receiver. The headend may be configured to generate encrypted digital media streams. The network may be coupled to the headend and configured to receive the encrypted digital media streams. The at least one receiver may be coupled to the network and configured to receive the encrypted digital media streams and present a decrypted version of the encrypted digital media streams. At least one of the headend and the at least one receiver comprises a security processor that may be configured to provide at least one of simultaneous multiple encryption and simultaneous multiple decryption processing of the digital media streams.

For example, in one implementation the headend may utilize the security processor of the present invention to encrypt the digital media streams and the one or more receivers may use a conventional approach to decrypt the digital media streams. In another example, the headend may utilize a conventional approach to encrypt the digital media streams and one or more of the receivers may use the security processor of the present invention to decrypt the digital media streams. In yet another example, the headend may utilize the security processor of the present invention to encrypt the digital media streams and one or more of the receivers may use the security processor of the present invention to decrypt the digital media streams. In all of the implementations, the headend generally encodes, compresses, grooms, statmuxs, and otherwise appropriately processes the digital media streams. The receivers may, in one example, be implemented as set top boxes (STBs). In other examples, the receiver (receiving device) may be implemented as a television, high definition television (HDTV), monitor, host viewing device, MP3 player, audio receiver, radio, personal computer, media player, digital video recorder, game playing device, etc.

Also according to the present invention, a method of multi-stream security processing and distributing digital media streams is provided. The method comprises generating encrypted digital media streams at a headend. The method further comprises coupling a network to the headend and receiving the encrypted digital media streams at the network. The method yet further comprises coupling at least one receiver to the network and receiving the encrypted digital media streams at the receiver, and presenting a decrypted version of the encrypted digital media streams using the receiver. At least one of the headend and the at least one receiver comprises a security processor that may be configured to provide at least one of simultaneous multiple encryption and simultaneous multiple decryption processing of the digital media streams.

Further, according to the present invention, for use in a system for multi-stream security processing and distributing digital media streams, a security processor configured to provide at least one of simultaneous multiple media transport stream decryption and encryption processing is provided. The security processor comprises a controller and a plurality of digital stream engines. The digital stream engines may be selectively parallel coupled by the controller for simultaneous operation in response to a predetermined security configuration.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
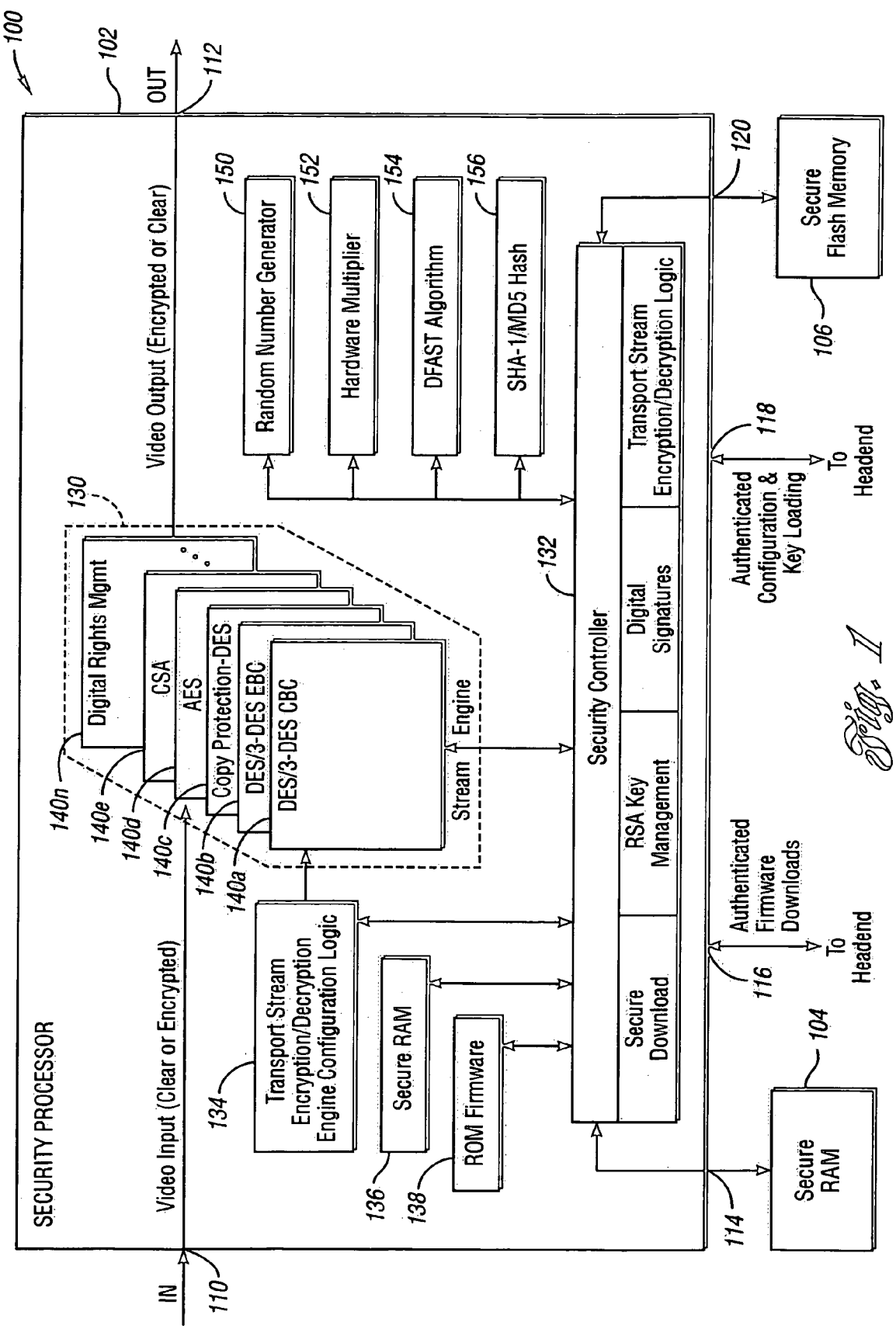
FIG. 1 is a diagram a media stream security processor of the present invention.

With reference to the Figures, the preferred embodiments of the present invention will now be described in detail. In one example, the improved system and method for security processing digital media streams (e.g., media streams that include video, audio, video plus audio, and the like in any appropriate format or protocol such as Motion Picture Expert Group (MPEG), MPEG-2, MPEG-4, Windows Media 9, Real Media, etc. streams) of the present invention may be implemented in connection with a cable (or satellite) television delivery system. However, the present invention may be implemented in connection with any appropriate media stream delivery system to meet the design criteria of a particular application. The present invention may dis-aggregate (i.e., separate, break apart, etc.) content security algorithms (i.e., routines, processes, operations, etc.) that are typically proprietary from the respective infrastructure components (e.g., media stream delivery system headend components and set top boxes (STBs), and the like).

The dis-aggregation provided by the present invention may dramatically lower the cost for infrastructure owners (e.g., media stream delivery system vendors, providers, operators, etc.) to switch (i.e., change, migrate, transition, evolve, upgrade, shift, modify, etc.) between different content security systems and methods. The dis-aggregation may provide for the manufacture and distribution of digital media stream delivery devices that are compatible with past (or legacy), present and future infrastructure, regardless of specific content security systems and methods that are used in the infrastructure.

The dis-aggregation provided by the present invention may include dis-aggregation of security features that generally use hardware re-configuration from the security features that can be renewed in software. The present invention may provide more efficient manufacturing and distribution, and may enable new business models, including the retail availability of extremely low cost customer premises equipment (CPE, such as STBs, host digital devices, etc.).

The present invention may provide flexibility to enable infrastructure transitions between different content security systems and method, including transitions from 'legacy' (i.e., past or previous implementation, earlier generation, backward compatible with older, etc.) systems that generally use proprietary content security. The present invention may provide for ease in introducing new conditional access systems (CASs) into a media stream vendor (provider) network that has legacy hardware and software. The transition time and expense of performing a transition to a new CAS can be extremely prohibitive using conventional approaches particularly when the transition should be performed in a short time period. The present invention may provide the multisystem operator (MSO) (i.e., the media stream provider) the ability to support legacy systems and make a transition to a new CAS or to an alternative proprietary CAS, as desired, thereby making a more smooth and cost effective transition that may be amortized over a longer time period. The present invention may also provide media stream processing and delivery service providers the ability to transition from any rights management system or process to any appropriate CAS.

The present invention may provide a renewable and re-configurable security system and method that may be used to encrypt content and services in a cable headend (e.g., servers, processors, etc.). The present invention may also be used to decrypt content and services in the receiving devices (e.g., STBs, viewing devices, etc.). The present invention may provide flexible support for encryption and decryption of multiple CASs, Digital Rights Management, and the like. The present invention may provide support for authentication of devices. The present invention generally provides novel and improved concepts in renewability and hardware re-configuration for conditional access and digital rights management systems.

The present invention may use a highly secure role-based authentication process (i.e., method, routine, steps, blocks, operation, etc.) to configure and renew the overall security system, and security key (i.e., code, authorization, etc.) management techniques. The role-based authentication of the present invention may provide a logon to the security processor to enable access to certain functions as a user for media stream decryption and encryption. In the same way, the role-based authentication of the present invention generally enables an Administrator, Supervisor, or other authorized user to logon with a different password or key to enable the configuration, re-configuration, and renewability of the software and hardware.

The present invention may be used to decrypt any appropriate media streams in home STB, host digital television devices, and the like. The present invention may support encryption and decryption of legacy (i.e., past, prior, previously implemented, etc.) CASs, a digital video broadcasting-common scrambling algorithm (DVB-CSA) CAS system, Digital Rights Management, and the like for video, audio, video plus audio, etc., and for newly developed CASs.

The commercial value of the present invention may be very large since the present invention may enable all of the consumer electronics industry to innovate new types of products for MSOs, and all media stream processing and delivery equipment companies are potential customers for the present invention. The present invention may lower the overall cost of producing STBs and digital televisions, thereby providing significant cost and time savings to the MSOs and customers of the MSOs. By providing dramatically lower costs as well as increased innovation and new business models, the present invention may provide the user significant commercial advantages when compared to conventional approaches.

The present invention generally provides an improved system and method to securely configure, renew, and re-configure (using role-based authentication) an encryption/decryption apparatus to support both proprietary, legacy CASs, other proprietary CAS implementations (e.g., apparatuses from vendors such as NDS, Nagravision, Irdeto, Canalplus, etc.), DVB-CSA implementations, and one or more CAS systems using novel and unique transport encryption algorithms and novel and unique security key management techniques.

The present invention generally provides novel concepts in the ability to securely configure, renew, and re-configure media stream distribution system products to support both proprietary, legacy conditional access systems (CASs), other proprietary CAS implementations (e.g., NDS/Nagravision, Irdeto, Canalplus, DVB-CSA implementations, etc.), and one or more new CAS systems using new transport encryption algorithms and new key hierarchy techniques. In contrast, conventional systems and methods for digital media stream security typically are implemented using a single, proprietary system that is expensive and difficult to change (e.g., upgrade, modify, transition, evolve, replace, etc.).

Referring to FIG. 1, a diagram illustrating a media stream system (i.e., processor, apparatus, circuit, transceiver, etc.) 100 of the present invention is shown. The system 100 may be implemented in connection with a digital media stream distribution system (described in more detail in connection with FIG. 2). The system 100 is generally implemented as a security processor (or processing system) that provides at least one security feature (e.g., encryption, decryption, authentication, security key management, copy protection, digital rights management, etc.) to at least one digital media input/output stream. The system 100 may be implemented as a security processor that may be configured to provide at least one of simultaneous multiple encryption and simultaneous multiple decryption processing of the digital media streams.

The system 100 generally comprises a security processor 102, a random access memory (RAM) 104, and a flash memory 106. The RAM 104 and the flash 106 are generally implemented as secure (i.e., intruder resistant) memories. In one example, the RAM 104 and the flash 106 may be implemented external to the processor 102. Such an implementation may provide easy physical access for changing the RAM 104 and the flash 106 in implementations where such a feature is desired.

The processor 102 may have an input 110 that may receive a stream (e.g., IN), an output 112 that may present (i.e., transmit, broadcast, send, etc.) a stream (e.g., OUT), an input/output 114 that may couple (i.e., connect, hook up, wire, interface, etc.) the processor 102 and the RAM 104, an input/output 116 and an input/output 118 that each may couple the processor 102 and a headend (described in connection with FIG. 2), and an input/output 120 that may couple the processor 102 and the flash 106.

The streams IN and OUT may be implemented as digital media streams that may be in an encrypted or in a clear (i.e., unencrypted or decrypted) state. The streams IN and OUT are each generally implemented as a digital media signal stream (e.g., an MPEG, MPEG-2, etc. stream or other transport stream). In one example, the stream OUT may be implemented as a decrypted (and decompressed) version of the stream IN. In another example, the stream OUT may be implemented as an encrypted (and compressed) version of the stream IN. In yet example, the streams OUT and IN may both may be implemented as a encrypted (and compressed) streams. However, the streams IN and OUT may be implemented having any appropriate format and protocol to meet the design criteria of a particular application. The input/output 116 may be configured to perform interfacing between the headend (e.g., headend 202 of FIG. 2) and the processor 102 that corresponds to (or is related to) firmware downloads that are authenticated. The input/output 118 may be configured to perform interfacing between the headend and the processor 102 that corresponds to (or is related to) configuration and key loading that is authenticated.

The security processor 102 generally comprises an engine 130 (described in more detail below), an automatic resource (or re-hosting) manager security processor (or controller) 132, transport stream encryption/decryption engine configuration logic 134, secure RAM 136, read only memory (ROM) 138, and at least one of a random number generator 150, a hardware multiplier 152, a dynamic feedback arrangement scrambling technique (DFAST) algorithm 154 (i.e., a RAM or ROM that contains the appropriate algorithm), and a hash generation algorithm 156 (e.g., a SHA-1, an MD5, and the like) algorithm (i.e., a RAM or ROM that contains the appropriate algorithm).

The engine 130 is generally implemented as a digital media stream encryption/decryption engine. The stream engine 130 may receive the stream IN and present the stream OUT. The engine 130 is generally coupled (i.e., connected, wired, hooked up, interfaced, etc.) to the controller 132 and the logic 134. The engine 130 generally comprises at least one digital media stream encryption/decryption engine 140 (e.g., engines 140a-140n). When multiple devices 140 are implemented, the engines 140 are generally configured to be coupled in parallel. The engines 140 are generally selectively parallel coupled by the controller 132 in response to a predetermined security configuration.

The processor (or controller) 132 may be coupled to the logic 134, the RAM 136, the firmware 138, the generator 150, the multiplier 152, the DFAST algorithm 154, and a hash generation algorithm 156. The RAM 104 and the flash 106 are generally coupled to the processor 132. The RAM 104 and the flash 106 may be implemented to provide secure, readily swappable upgrades to the system 100. The controller 132 generally controls the operation of the system 100 in response to at least one (one or more) algorithms (e.g., routines, methods, processes, steps, blocks, procedures, etc. of the predetermined security configuration) that may be stored (i.e., saved, held, etc.) in at least one of the RAM 104, the flash 106, the logic 134, the RAM 136, the ROM 138, the generator 150, the multiplier 152, the DFAST algorithm 154, and the hash 156, as well as internally in connection with the processor 132.

The processor (or controller) 132 generally provides for secure downloads, RSA (named after the three inventors—Ron Rivest, Adi Shamir and Leonard Adleman) key management, multiple key management, digital signatures, and the like, and may include transport stream encryption/decryption logic. The devices (e.g., the logic 134, the RAM 136, the ROM 138, the generator 150, the multiplier 152, the algorithm 154, the hash 156, etc.) may be coupled in parallel. The controller 132 generally couples and controls the appropriate engine or engines 140 and the other devices (e.g., the logic 134, the RAM 136, the ROM 138, the generator 150, the multiplier 152, the algorithm 154, the hash 156, etc.) to meet the design criteria (i.e., the predetermined, desired security configuration) of a particular application.

The system 100 architecture may be defined in terms of a set of security elements (SEs, e.g., interconnection and interaction of the stream engines 140, the logic 134, the RAM 136, etc. as controlled via the processor 132) and descriptions of how the SEs are used (i.e., implemented, employed, utilized, etc.) to meet design criteria of particular applications. The system 100 may provide transport media stream security service for a range of security environments from the most basic in which the only service is a low-end digital video service, to a multi-play high end environment with digital video, digital recording, data, and multimedia services. The system 100 generally provides elements that may be configured in parallel (e.g., the engines 140, etc.), to encrypt a series of security streams (e.g., the stream IN when implemented in connection with a headend) that are sent out to the network (e.g., the stream OUT) and also (e.g., when implemented in connection with a STB or host device) be used to decrypt services (e.g., the stream IN) on a single end-user device for subscriber services (e.g., a clear, decrypted, viewable version of the stream OUT).

A so-called "hash" is generally a function (or process) that converts an input (e.g., the input stream, IN) from a large domain into an output in a smaller set (i.e., a hash value, e.g., the output stream, OUT). Various hash processes differ in the domain of the respective input streams and the set of the respective output streams and in how patterns and similarities of input streams generate the respective output streams.

Data Encryption Standard (DES) is a fixed-key-length security algorithm that employs 56-bit length keys. Any 56-bit number can be implemented as a DES key. The relatively short key length renders DES vulnerable to brute-force attack wherein all possible keys are tried one by one until the correct key is encountered (i.e., the key is "broken").

In one example, the engine 140a may be implemented as a DES/3-DES stream engine that operates via (i.e., through, using, etc.) a legacy system Cipher Block Chaining (CBC) mode. The legacy CASs use 56-bit DES in CBC mode for the MPEG-2 transport security. The legacy system also uses DFAST scrambling on the DES CBC initialization vector as well as certain DES keys. Triple DES (3-DES) (i.e., application of DES encryption three times using three different keys) for a total key bitwidth of 112 or 168 bits) is also used to protect certain structures and the key inside entitlements. The legacy CAS also sends an increment value in the Out Of Band (OOB) channel that is used mathematically with a content key to generate a final DES working key for encrypting or decrypting the MPEG stream packets. The working key is generally changed on a variable frequency as set (i.e., predetermined, selected, etc.) by the headend.

In one example, the engine 140b may be implemented as a DES/3-DES stream engine that operates via an alternative legacy system Electronic Code Book (ECB) mode. The alternative legacy CAS uses a 56-bit DES in ECB mode for the MPEG-2 transport security. The alternative legacy CAS also uses triple DES (i.e., 112 bit or 168 bit encryption on the DES keys and to protect entitlements. The alternative legacy CAS also sends a value in the OOB channel that is used mathematically with the content key to generate a final DES working key for encrypting or decrypting the MPEG stream packets. The working key is generally changed on a variable frequency that is predetermined by the headend.

In one example, the engine 140c may be implemented as an OpenCable (SCTE-41) Copy Protection mode stream engine that uses 56-bit DES in ECB) mode for the MPEG-2 transport security. The OpenCable (SCTE-41) Copy Protection also uses a variation of the CAS DFAST scrambling on the DES keys, which are calculated and sent across the CableCARD interface to the host device. The DES Copy Protection key that is used in connection with the OpenCable (SCTE-41) Copy Protection is generally changed on a variable period, and the variable period is generally predetermined by variables in the CableCARD.

In one example, an engine 140 (not shown) may be implemented as a CAS DES mode digital video stream security processing engine. The CAS DES mode may implement a standard (i.e., existing, currently implemented, etc.) algorithm for encryption such as DES ECB. The methods used to manage and verify the entitlements may be standardized such that multiple media service vendors are enabled to produce the corresponding system 100. The corresponding unit key for entitlement management messages (EMMs), category keys, content keys and a working key may be generated. Predetermined information (e.g., a random number, a system seed key, a vendor selected code, etc.) may be mathematically paired with the keys to provide protection for the overall security of the system 100 and the predetermined information may be standardized for the system 100.

In one example, the engine 140d may be implemented as a unique and novel advanced encryption standard (AES) mode stream engine that uses the standard AES algorithm for transport decryption and encryption. The methods used to manage and verify the entitlements may be standardized so that multiple media. service vendors are enabled to produce the corresponding system 100. Predetermined techniques (e.g., methods, routines, steps, processes, algorithms, etc.) may be implemented to generate the unit key for EMMs, category keys, content keys and a working key. Predetermined information (e.g., a vendor selected code) may be mathematically paired with the keys to provide protection for the overall security of the system 100 and the predetermined information may be standardized for the system 100.

In another example, an engine 140 (not shown) may be implemented as a Copy Protection/Digital Video Recorder (DVR) mode stream engine. The OpenCable (SCTE-41) Copy Protection system may be modified to support AES and the existing DES encryption algorithm for the DVR and Copy Protection security. The OpenCable (SCTE-41) Copy Protection uses a variation on the CAS DFAST scrambling on the DES keys, which are calculated and sent across the CableCARD interface to the respective host device. When AES is used as an alternative algorithm, the 128-bit key can be scrambled by the DFAST algorithm and sent from the CableCARD to the host device. AES is generally a much more secure algorithm to use for the storing of digital content in a digital video recording when compared to DES and therefore may be preferable for DVR applications.

In one example, the engine 140e may be implemented as a Common Scrambling Algorithm (CSA) stream engine. The engine 140e may be implemented using a DVB-CSA Standard Mode as implemented by vendors such as NDS and Nagravision. DVB-CSA CASs use a 40-bit CSA for the MPEG-2 transport security. DVB-CSA also uses triple DES encryption for the CSA keys. DVB-CSA CASs also use a value that is combined mathematically (e.g., via the multiplier 152) with the content key to generate a final CSA working key for encrypting or decrypting the MPEG stream packets. The working key is generally changed on a variable frequency that is predetermined by the headend.

In another yet example, an engine 140 (not shown) may be implemented as a unique and novel CAS CSA mode stream engine. The CAS CSA mode may use the standard CSA algorithm for transport encryption and decryption. The methods used to manage and verify the entitlements may be predetermined and standardized such that multiple vendors may produce and support the system 100. Predetermined techniques may be implemented to generate the unit key for EMMs, category keys, content keys and a respective working key. Predetermined information (e.g., user selected codes) may be mathematically paired with these keys to protect the overall security of the new CAS systems and the predetermined information may be standardized for the system 100.

In one example, the engine 140n may be implemented as a Digital Rights Management (DRM) digital media stream engine. The present invention may provide a system and a method for a DRM stream and license file processing using at least one standard algorithm (e.g., DES, AES, CSA, etc.) for transport encryption and decryption. The methods used to manage and verify the entitlements in the rights licenses may be predetermined and standardized such that multiple vendors may produce and support the system 100. Predetermined techniques may be implemented to generate the unit key for the rights entitlements (i.e., license files). The implementations of category keys, content keys and the working key are not typically part of the standard DRM solution. Predetermined information (e.g., user selected codes) may be mathematically paired with the keys to provide protection for the overall security of the DRM solution of the present invention and the information may be standardized. The DRM solution implemented using the present invention may be configured to support various DRM security implementations including, but not limited to, Windows DRM and Real Networks DRM.

In one example, to improve performance, a number of features implemented via the security processor 100 may be implemented in hardware (e.g., the configuration logic 134). The respective hardware is generally re-configurable instead of software renewable. For instance, the extraction of the content key from the entitlement control message (ECM) and the modification performed on the content key may be implemented in hardware to provide improved performance (e.g., faster processor 100 operation, better reliability, etc.). The content key configuration is generally used for all of the transport decryption engines defined in the security system 100 to load the final working keys. When implemented in hardware, the configuration logic generally provides support to mathematically pair the content key with the modifier value, at a predetermined frequency using a predefined mathematical function. The mathematical functions that may be implemented in connection with the security system 100 (e.g., via the multiplier 152) generally include Boolean XOR, Simple Add, Multiply, and any other appropriate functions to meet the design criteria of a particular application.

The present invention may provide for securely upgrading all or part of the various software components of key management logic via renewable software (e.g., software that is implemented in connection with the RAM 104, the flash 106, RAM 136, the ROM 138, etc.). The present invention may process and validate unit keys via unit key logic. The unit key logic may be protected in the security architecture of the system 100 (e.g., secure RAM 104, secure flash 106, etc.). When a respective remote device (not shown) completes a logon process (described below), the unit key logic may be upgraded in a secure manner using a signed code image to protect the integrity of the upgrade.

The present invention may provide for securely processing and validating EMMs via EMM Logic. The EMM logic is generally protected in the security architecture of the system 100. When the remote device completes the logon process, the EMM logic may be upgraded in a secure manner using a signed code image to protect the integrity of the upgrade.

The present invention may provide for securely processing and validating category keys via category key logic. The category key logic is generally protected in the security architecture of the system 100. When the remote device completes the logon, the category key logic may be upgraded in a secure manner using a signed code image to protect the integrity of the upgrade.

The present invention may provide for securely processing and validating an entitlement control message (ECM) via ECM key logic. The ECM key logic is generally protected in the security architecture of the system 100. When the remote device completes the logon, the ECM key logic may be upgraded in a secure manner using a signed code image to protect the integrity of the upgrade.

The present invention may provide for securely processing and validating the working keys via working keys logic. The working keys logic is generally protected in the security architecture of the system 100. When the remote device completes the logon, The working keys logic may be upgraded in a secure manner using a signed code image to protect the integrity of the upgrade.

The system 100 generally supports at least one of highly secure and authenticated configuration, re-configuration, and renewability using role-based authentication. At least one of configuration, renewability, and re-configuration of the present invention is generally performed after a remote authentication occurs. A logon request is generally made from the headend to perform the configuration change via a cryptographic ignition key split (CIK). The CIK generally permits the headend to login to the system 100 in a supervisor role. When the login is completed, the re-configuration request is generally performed from the data sent in the corresponding message. When the login is completed successfully, software downloads may be performed to upgrade key logic or to modify hardware configurations of the transport decryption. When the configuration, renewal and re-configuration are complete, the headend may present a logoff request.

The present invention generally provides for authentication via a number of processes. For RSA key management and generation, the system 100 may generate a predetermined bit-width (in one example, up to 4096-bit, however, any appropriate bit-width may be implemented) RSA keys and securely storing the private key for use in digital signatures. The system 100 processor (e.g., the processor 132) may generate digital signatures securely without exposing the respective private key. The system 100 may verify digital signatures on signed messages and certificates received for authentication.

The present invention generally provides for generating SHA-1 hash values and for generating Message Digest 5 (MD5) hash values for use in digital signatures (e.g., via the hash generator 156). The present invention generally provides for generation of and verification of digital signatures (e.g., via the processor 132). Public key signatures for the present invention may be generated and verified using the RSA signature algorithm described in FIPS-PUB 180-1, "Secure Hash Standard".

The present invention generally provides for generation of and verification of standard and virtual public key infrastructure/information (PKI). The present invention generally provides support for a predetermined number (e.g., up to a 4 tier, greater than 4 tier, etc.) of standard PKI chain of X.509 certificates. The present invention generally provides support for the secure storage and usage of one RSA private key up to 4096-bits in size. However, any appropriate size may be implemented to meet the design criteria of a particular application.

Virtual PKI is a method in which certificates are not installed from a true external PKI chain. Data elements for the Validity Period, the CA certificate, the Distinguished Name and the related extensions may be sent to the system 100 at initialization time. The present invention generally processes the data elements to digitally sign certificates internally for use in later authentication purposes on a network.

Certificate validation generally includes validation of a linked chain of certificates from the end entity certificates to a valid Root. For example, the signature on the device certificate is verified with the Issuing CA Certificate and then the signature on the manufacturer CA certificate is verified with the Root CA certificate. The Root CA certificate is generally self-signed and the Root CA certificate is generally received from a trusted source in a secure way. The public key present in the Root CA Certificate is generally used to validate the signature on the Root CA certificate. The present invention generally provides for the support of the exact rules for certificate chain validation that generally fully comply with IETF RFC 3280, "Internet X.509 Public Key Infrastructure Certificate and CRL Profile", and may be referred to as "Certificate Path Validation" rules.

The present invention generally provides for the generation of a predetermined number (e.g., in one example, an up to 384-bit, however any appropriate bit-size may be implemented) elliptic curve (EC, i.e., growth) keys and for securely storing the private key for use in digital signatures. The processor of the present invention (e.g., processor 132) may generate EC-DSA digital signatures securely without exposing (i.e., revealing) the respective private key. The processor 132 may verify elliptic curve digital signature algorithm (EC-DSA) digital signatures on signed messages and certificates received for authentication.

The present invention generally provides for strong (i.e., highly random, non-deterministic, etc.) random number generation (e.g., via the generator 150). In one example, the generator 150 may produce true-random seeds (e.g., seeds generated per RFC 1750 and FIPS 140-2). In another example, the present invention may implement a per-device secret (e.g., a vendor selected code or random number generator) installed at manufacture time and used in the random number generation process.

The present invention generally provides for support of simultaneous multiple media transport streams decryption and encryption processing (i.e., multi-stream security). The transport encryption/decryption engines (e.g., the engines 140) generally support at least two or more simultaneous transport stream decryption and encryption processes, and each respective algorithm (e.g., DES, AES, CSA, etc.) depending on overall gate count of the system 100. The present invention may easily implement parallel devices (e.g., parallel coupled stream engines 140) and thus increase multiple transport stream encryption and decryption. Parallel devices (e.g., the logic 134, the RAM 136, the ROM 138, the generator 150, the multiplier 152, the algorithm 154, the hash 156, etc.) may also be used to implement multiple key management schemes for conditional access and for digital rights management.

The system 100 may be utilized in the headend of the media stream distribution system for transport stream encryption in highly parallel configurations. The present invention generally provides for the headend implementation in a more cost effective manner than conventional approaches.

In one example, the present invention generally provides for support of at least 2 streams of high definition (HD) transport decryption and encryption at a rate of approximately 19.4 megabits per second. However, the present invention may be configured to support any appropriate number of streams of transport decryption and encryption at any appropriate rate.

The present invention generally provides for support session based transport decryption and encryption in the development of video on demand (VOD) security. Similarly, the present invention generally provides for support of real-time session based VOD key management.

The present invention generally provides support for all related (or corresponding) manufacturing and operational considerations. The present invention may provide support for passage mode partial encryption and decryption in all of the transport encryption engines for all algorithms implemented via the apparatus 100.

Figure 2:
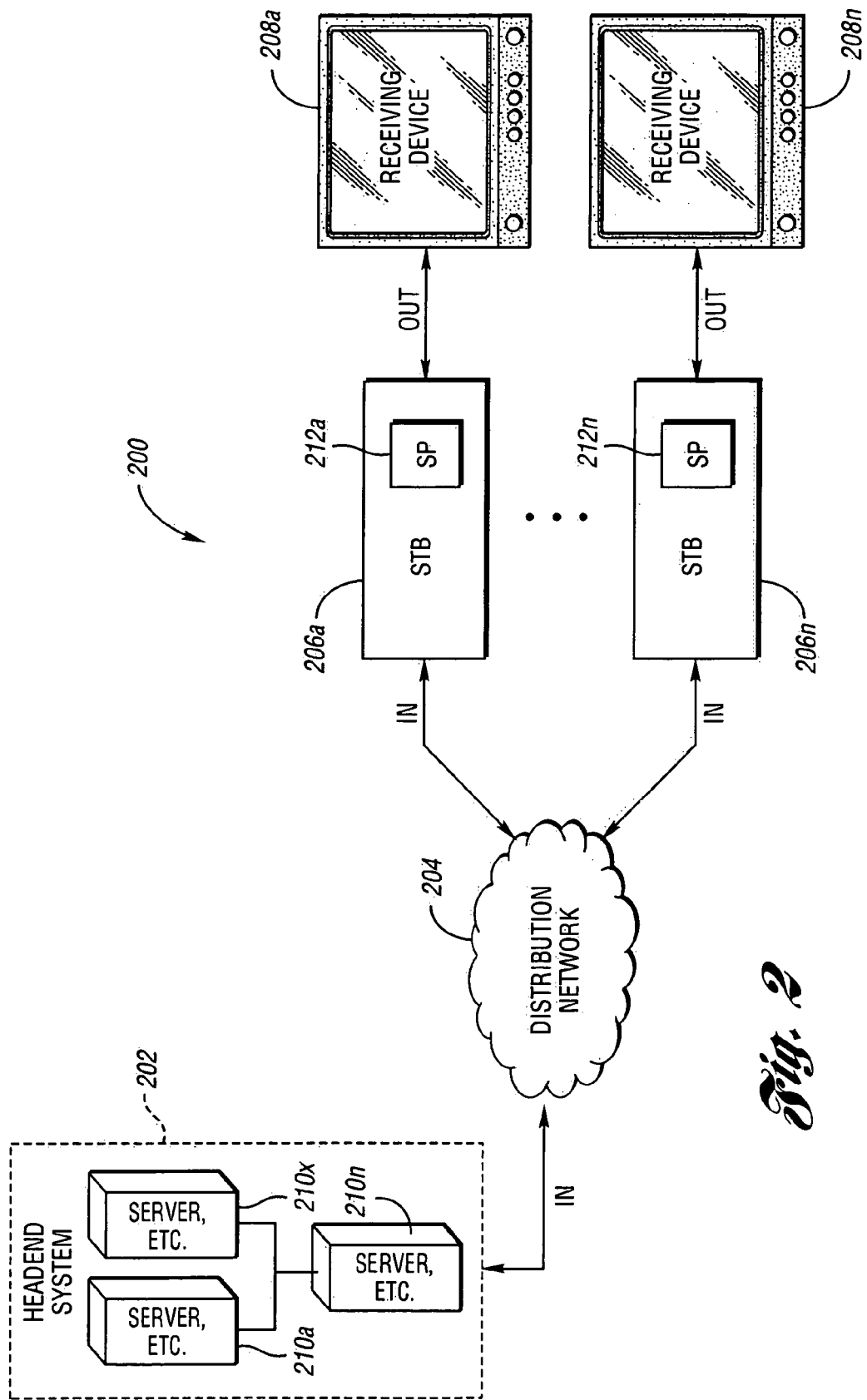
FIG. 2 is a diagram of a media processing and delivery system implementing the present invention.

Referring to FIG. 2, a diagram illustrating a media stream processing and distribution system 200 implemented in connection with the present invention is shown. The distribution system 200 generally comprises a headend 202, a network 204, at least one set top box (STB) 206 (generally a plurality of STBs 206a-206n), and at least one respective receiving device (i.e., receiver, transceiver, etc.) 208 (generally a plurality of devices 208a-208n). The distribution system 200 is generally implemented as a media service provider/subscriber system wherein the provider (or vendor) generally operates the headend 202 and the network 204, and also provides a subscriber (i.e., client, customer, service purchaser, user, etc.) with the STB 206. The STB 206 is generally located at the subscriber location (not shown, e.g., home, tavern, hotel room, business, etc.) and the receiving device 208 is generally provided by the client. The device 208 is generally implemented as a television, high definition television (HDTV), monitor, host viewing device, MP3 player, audio receiver, radio, personal computer, media player, digital video recorder, game playing device, etc. The device 208 may be implemented as a transceiver having interactive capability in connection with the STB 206, the headend 202, or both the STB 206 and the headend 202.

The headend 202 is generally electrically coupled to the network 204, the network 204 is generally electrically coupled to the STB 206, and each STB 206 is generally electrically coupled to the respective device 208. The electrical coupling may be implemented as any appropriate hardwired (e.g., twisted pair, untwisted conductors, coaxial cable, fiber optic cable, hybrid fiber cable, etc.) or wireless (e.g., radio frequency, microwave, infrared, etc.) coupling and protocol (e.g., HomePlug, HomePNA, IEEE 802.11(a-b), Bluetooth, HomeRF, etc.) to meet the design criteria of a particular application. While the distribution system 200 is illustrated showing one STB 206 coupled to a respective one device 208, each STB 206 may be implemented having the capability of coupling more than one device 208 (not shown).

The headend 202 generally comprises a plurality of devices 210 (e.g., devices 210a-210n) that are implemented as data servers, computers, processors, security encryption and decryption apparatuses or systems, and the like configured to provide video and audio data (e.g., movies, music, television programming, and the like), processing equipment (e.g., provider operated subscriber account processing servers), television service transceivers (e.g., transceivers for standard broadcast televison and radio, digital televison, HDTV, audio, MP3, text messaging, gaming, etc.), and the like. In one example, the headend 202 may generate and present (i.e., transmit, provide, pass, broadcast, send, etc.) the stream IN. At least one of the devices 210 (e.g., device 210x), may be implemented as the security system 100 as described above in connection with FIG. 1. The device 210 that is implemented as a security system 100 may receive clear or encrypted video and audio data and present clear or encrypted (and compressed or uncompressed) video and audio data.

The network 204 is generally implemented as a media stream distribution network (e.g., cable, satellite, and the like) that is configured to selectively distribute (i.e., transmit and receive) media service provider streams (e.g., standard broadcast televison and radio, digital televison, HDTV, audio, MP3, text messaging, games, etc.) for example, as the stream IN to the STBs 206 and to the receivers 208, for example as the stream OUT. The stream IN is generally distributed based upon (or in response to) subscriber information. For example, the level of service the client has purchased (e.g., basic service, premium movie channels, etc.), the type of service the client has requested (e.g., standard TV, HDTV, interactive messaging, etc.), and the like may determine the media streams that are sent to (and received from) a particular subscriber.

The STB 206 is generally implemented as an STB having multiple stream capability (e.g., standard broadcast televison and radio, digital televison, audio, MP3, high definition digital television (HDTV), text messaging, etc.). The STB 106 generally comprises at least one respective security processor 212. The security processor 212 may be implemented as the security processor (or system) 100. The processor 212 may receive encrypted (and compressed) video and audio data (e.g., the stream IN) and present clear video and audio data (e.g., the stream OUT) to the receiver 208. In one example (not shown), the security processor (or system) 100 may be implemented in connection with the device 208. The device (e.g., transceiver) 208 may send an encrypted or a clear media stream to the headend 202 via the STB 206 and the network 204. As such, the system 100 of the present invention may be implemented in any of the headend 202, the STB 206, and the receiving device 208, alone or in combination.

Figure 3:
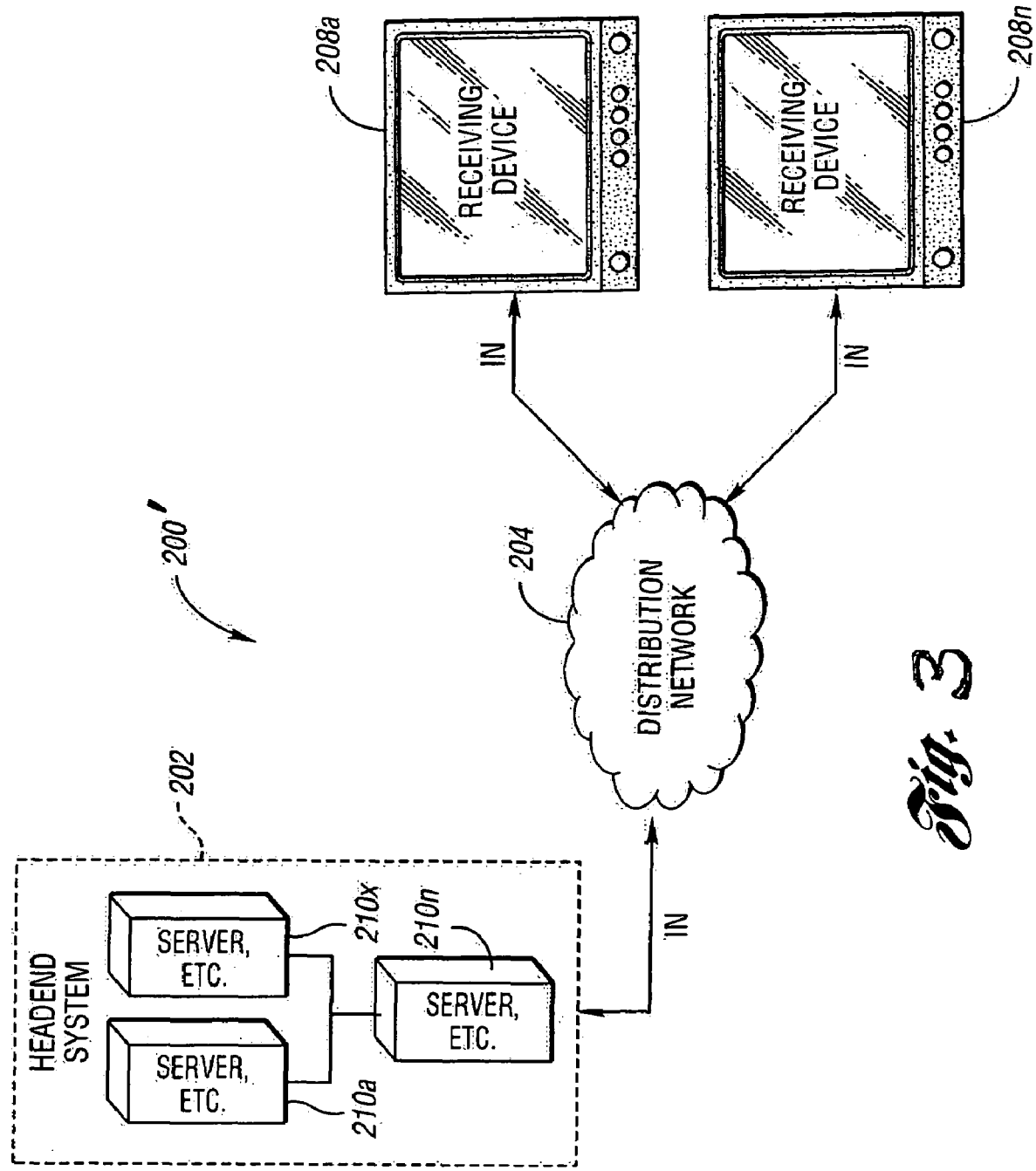
FIG. 3 is a diagram of another media processing and delivery system implementing the present invention.

Referring to FIG. 3, a diagram illustrating a media stream processing and distribution system 200' implemented in connection with the present invention is shown. The distribution system 200' generally comprises the headend 202, the network 204, and at least one of the receiving device (i.e., receiver, transceiver, etc.) 208 (generally a plurality of the devices 208a-208n). The receiving device 208 is generally coupled directly to the network 204 and receives the signal IN.

In yet another example (not shown), the system 200' may be implemented having at least one STB 206 coupled to the network 204 and with at least one receiver 208 coupled thereto, as well as having at least one device 208 that is directly coupled to the network 204.

The improved system and method of the present invention may ease the difficulty in introducing new conditional access systems into an MSO network due the legacy hardware and software already deployed. In contrast, the time and expense of performing a transition to a new conditional access system can be extremely prohibitive particularly if the transition must occur in a short time period when conventional approaches are used. The present invention may provide an MSO the ability to support legacy systems and make a transition to a new CAS or alternative proprietary CAS as desired, thereby facilitating a more smooth and cost effective transition that may be able to be amortized over a longer time period. The present invention may provide support for the parameters of retail distribution.

As is readily apparent from the foregoing description, then, the present invention generally provides an improved system and an improved method for a configurable, renewable, and re-configurable security system and method used to encrypt/decrypt media streams in a digital media stream distribution system (e.g., in a headend, in a STB, in host digital television devices, and the like). The present invention may provide support for encryption and decryption of legacy CASs, the DVB-CSA CAS proprietary systems, Digital Rights Management for media (e.g., video, audio, video plus audio, etc.), Video On Demand, and newly developed conditional access systems. The present invention may provide support for authentication of devices and generally provides novel concepts in renewability and hardware re-configuration for media conditional access systems. The present invention may provide for use of a highly secure role-based authentication to securely configure and renew the overall security system and key management techniques in a digital media stream processing environment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for multi-stream security processing and distributing digital media streams, the system comprising:
a headend configured to generate encrypted digital media streams and download software;
a network coupled to the headend and configured to receive the encrypted digital media streams and downloaded software; and
at least one receiver coupled to the network and configured to receive the encrypted digital media streams and downloaded software and to present a decrypted version of the encrypted digital media streams based on the downloaded software, wherein the receiver comprises a security processor configured to provide at least one of simultaneous multiple encryption and simultaneous multiple decryption processing of the digital media streams, the security processor operative to store the downloaded software and to securely configure, renew, and re-configure at least one of encryption and decryption by the security processor based on the downloaded software;
wherein the security processor comprises a plurality of digital stream encryption/decryption engines that are selectively parallel coupled by a controller for simultaneous operation in response to a predetermined security configuration;
wherein the security configuration comprises at least one of Data Encryption Standard (DES), Triple DES (3-DES), Advanced Encryption Standard (AES), and Common Scrambling Algorithm (CSA).

2. The system of claim 1 wherein the media streams are at least one of a video stream, and audio stream, and a video plus audio stream.

3. The system of claim 1 wherein the security configuration comprises at least one of a secure download, RSA key management, multiple security key management, authentication, copy protection, and digital signatures.

4. The system of claim 1 wherein the security processor further comprises at least one of a memory containing a hash, engine encryption/decryption configuration logic, a random number generator, a multiplier, and a memory containing a dynamic feedback arrangement scrambling technique (DFAST) algorithm coupled in parallel to the controller and configured to provide multiple key management for at least one of conditional access and digital rights management.

5. The system of claim 1 wherein the security processor further comprises at least one of a swappable random access memory (RAM) and a swappable flash memory containing the predetermined security configuration.

6. The system of claim 1 wherein the security processor provides role-based authentication that is used by an authorized user for at least one of configuration, reconfiguration, and renewal.

7. The system of claim 1, wherein the receiver is at least one of a set top box (STB), and a receiver or transceiver for at least one of digital televison, high definition digital television (HDTV), audio, MP3, text messaging, and game digital streams.

8. The system of claim 1, wherein the receiver is a set top box (STB) and the system further comprises an additional receiving device including the security processor, coupled to the STB and configured to receive and decrypt the encrypted digital media streams using the security processor.

9. A method of multi-stream security processing and distributing digital media streams, the method comprising:
generating encrypted digital media streams at a headend;
coupling a network to the headend and receiving the encrypted digital media streams at the network;
coupling a receiver to the network, the receiver receiving a software download from the network;
receiving the encrypted digital media streams at the receiver, and presenting a decrypted version of the encrypted digital media streams using the receiver;
re-configuring a security processor in the receiver based on the software download to provide at least one of simultaneous multiple encryption and simultaneous multiple decryption processing of the digital media streams; and storing the software download in the security processor;

wherein the security processor comprises a plurality of digital stream encryption/decryption engines that are selectively coupled by a controller for simultaneous operation in response to a predetermined security configuration;

wherein the security configuration comprises at least one of Data Encryption Standard (DES), Triple DES (3-DES), Advanced Encryption Standard (AES), and Common Scrambling Algorithm (CSA).

10. The method of claim 9 wherein the media streams are at least one of a video stream, and audio stream, and a video plus audio stream.

11. The method of claim 9 wherein the security configuration comprises at least one of a secure download, RSA key management, multiple security key management, authentication, copy protection, and digital signatures.

12. The method of claim 9 wherein the security processor further comprises at least one of a memory containing a hash, engine encryption/decryption configuration logic, a random number generator, a multiplier, and a memory containing a dynamic feedback arrangement scrambling technique (DFAST) algorithm coupled to the controller and configured to provide multiple key management for at least one of conditional access and digital rights management.

13. The method of claim 9 wherein the security processor further comprises at least one of a swappable random access memory (RAM) and a swappable flash memory containing the predetermined security configuration.

14. The method of claim 9 further comprising:

presenting the encrypted digital media streams from the receiver; and coupling an additional receiving device including the security processor to the receiver and receiving and decrypting the encrypted digital media streams at the receiving device using the security processor.

15. The method of claim 9 wherein the security processor provides role-based authentication that is used by an authorized user for at least one of configuration, reconfiguration, and renewal.

16. For use in a system for multi-stream security processing and distributing digital media streams, a security processor configured to provide at least one of simultaneous multiple media stream decryption and encryption processing, the security processor comprising:

a controller operative to be programmed through authenticated firmware downloads from a headend, each firmware download operative to modify media stream processing by the security processor;

a memory for storing the downloaded firmware; and a plurality of digital stream encryption/decryption engines that are selectively coupled by the controller for simultaneous operation in response to a predetermined security configuration downloaded to the controller;

wherein the security configuration comprises at least one of Data Encryption Standard (DES), Triple DES (3-DES), Advanced Encryption Standard (AES), and Common Scrambling Algorithm (CSA).

17. The security processor of claim 16 wherein the media streams are at least one of a video stream, and audio stream, and a video plus audio stream.

18. The security processor of claim 16 wherein the security configuration comprises at least one of a secure download, RSA key management, multiple security key management, authentication, copy protection, and digital signatures.

19. The security processor of claim 16 wherein the security processor further comprises at least one of a memory containing a hash, engine encryption/decryption configuration logic, a random number generator, a multiplier, and a memory containing a dynamic feedback arrangement scrambling technique (DFAST) algorithm coupled to the controller and configured to provide multiple key management for at least one of conditional access and digital rights management.

20. The security processor of claim 16 wherein the security processor further comprises at least one of a swappable random access memory (RAM) and a swappable flash memory containing the predetermined security configuration.

21. The security processor of claim 16 wherein the system for multi-stream security processing and distributing digital media streams comprises a headend, a network electrically coupled to the headend, a set top box (STB) coupled to the network, and a receiver coupled to the STB, and the security processor is implemented in connection with at least one of the headend, the network, the STB, and the receiver.

22. The security processor of claim 16 wherein the security processor provides role-based authentication that is used by an authorized user for at least one of configuration, reconfiguration, and renewal.

23. The security processor of claim 16 wherein the security processor is implemented in connection with a receiver or a transceiver that is at least one of a set top box (STB), and a receiver or transceiver for at least one of digital televison, high definition digital television (HDTV), audio, MP3, text messaging, and game digital streams.

* * * * *

UNITED STATES PATENT AND TRADEMARK OFFICE
CERTIFICATE OF CORRECTION

PATENT NO. : 7,620,179 B2
APPLICATION NO. : 10/767980
DATED : November 17, 2009
INVENTOR(S) : Fahrny et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1554 days.

Signed and Sealed this

Twenty-sixth Day of October, 2010

David J. Kappos
*Director of the United States Patent and Trademark Office*